June 3, 1969 J. W. FAUST, JR., ET AL 3,447,976
FORMATION OF HETEROJUNCTION DEVICES BY EPITAXIAL
GROWTH FROM SOLUTION
Filed June 17, 1966

WITNESSES:
Leon M. Garman
Robert C. Baird

INVENTORS
John W. Faust, Jr.
Harold F. John and Martin S. Rubenstein
BY
C. L. Menzemer
ATTORNEY

United States Patent Office 3,447,976
Patented June 3, 1969

3,447,976

FORMATION OF HETEROJUNCTION DEVICES BY EPITAXIAL GROWTH FROM SOLUTION

John W. Faust, Jr., Forest Hills, Harold F. John, Wilkinsburg, and Martin S. Rubenstein, Pitcairn, Pa., assignors to Westinghouse Electric Corporation, Pittsburgh, Pa., a corporation of Pennsylvania Filed June 17, 1966, Ser. No. 558,436
Int. Cl. B01j 17/04; H01l 7/04, 7/34
U.S. Cl. 148—1.5 2 Claims This invention relates to a process for growing epitaxial layers on a substrate and to the articles so produced.

An object of this invention is to provide a process for growing an epitaxial layer of one semiconductor material upon a substrate of another semiconductor material by a solution growth technique.

Another object of the present invention is to provide a solution growth process for producing monocrystalline junctions between two different semiconductor materials.

Other objects will, in part, be obvious and will, in part, appear hereinafter.

For a better understanding of the nature and objects of the invention, reference should be had to the following detailed description and drawings, in which.

In accordance with the present invention, there is provided a process for growing an epitaxial layer of a first semiconductor material upon a substrate of a second semiconductor material comprising (1) forming a solution comprised of at least the first semiconductor material and a solvent at an elevated temperature, (2) introducing a quantity of the second semiconductor material into the solution in the form of crystal bodies, and (3) lowering the temperature of the solution whereby the first semiconductor material crystallizes epitaxially onto the second semiconductor material.

Figure 1:
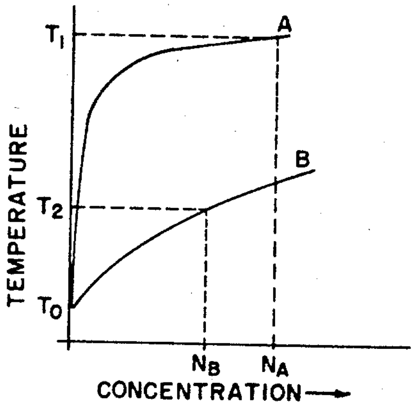
FIGURE 1 is a graphical presentation of the relationship between temperature and concentration of two semiconductor materials in solution.

More particularly and with reference to FIG. 1, the surprising discovery has now been made that when the solubilities of two semiconductor materials, A and B, in a third material, a solvent, which may or may not be one element of the A or B compound differ greatly in the temperature ranges involved, the concentrations can be adjusted so that B grows epitaxially onto A.

Referring to FIG. 1, theoretically as a solution containing $N_A$ grams of A and $N_B$ grams of B is cooled from temperature $T_1$ only A crystallizes out of solution until temperature $T_2$ is reached. By the time the temperature $T_2$ is reached, almost all of A is out of solution. As the temperature is lowered still further from temperature $T_2$ to $T_0$, B crystallizes epitaxially onto A.

The teachings of this invention are particularly applicable to those materials having the diamond cubic or zinc blend lattice structure. This includes silicon, germanium and most of Group III–Group V and Group II–Group VI compounds.

For the second material to deposit epitaxially upon the first, the lattice constant, that is the space between atoms in the lattice structure, should be similar. However, it has been found that the lattice constant of the two materials may vary as much as 25 percent without adversely affecting epitaxial growth.

As pointed out hereinabove the best and most practical results are achieved when the solubilities of the components A and B in the solvent differ greatly. The best results have been realized when the solubilities of the components A and B differ from one to three orders of magnitude in the solvent.

The concentration of the component A in the solvent material which will form the substrate, may vary from 1% to 30%, and preferably from 10% to 30% by weight, of the solution. If the concentration exceeds 30%, by weight, the crystals have a tendency to grow together in a random fashion as they come out of solution.

If the concentration is less than 1%, by weight, too few substrate crystals are formed. In the preferred range of from 10% to 30%, by weight, an adequate supply of individual suitable substrate crystals are formed.

The concentration of the component B, the material which forms the epitaxial layer, in the solvent should not exceed approximately one-half the concentration of the component A and preferably should vary from about 0.1% to 5% by weight, of the solution. It should not however exceed approximately one-half the concentration of A.

If the concentration of B in the solution exceeds one-half of the concentration of A, B may begin to crystallize with A and the substrate will be a mixture of A and B.

Suitable solvents for use in accordance with the teachings of this invention are the metallic elements of Group III of the Periodic Table, for example, boron, aluminum, gallium, indium and thallium in addition to tin, lead and zinc.

When either component A or B is a Group III–Group V compound a suitable solvent is more metallic Group III compound.

The actual temperatures $T_1$, $T_2$ and $T_0$ are difficult to determine due to the complexity of the systems. In actual practice it has been found satisfactory and more practical to heat the system to a temperature sufficient to ensure that all the components are in solution and then to cool the system at as slow a rate as possible, but not exceeding 10° C. per minute, to about 300° C. to 400° C. at which point the heat source is turned off and the system is allowed to cool to room temperature at its own rate.

It has been found that if the cooling rate exceeds 10° C. per minute octahedron growth will occur and even though B will still grow epitaxially on the substrate the octahedron is not suitable configuration for semiconductor device fabrication.

In practicing the teachings of this invention a charge consisting of components A and B in predetermined quantities and a suitable solvent are sealed in a chamber comprised of a material which is inert relative to the components A and B and the solvent, as for example a chamber of quartz.

The container is disposed in a furnace and the charge is heated to an elevated temperature at which both components A and B are completely in solution within the solvent. Care is taken to dispose the chamber within the furnace in such a way that there is a zero temperature gradient over the length of the chamber.

The heat to the furance is then reduced so that the molten charge is cooled at a uniform rate which does not exceed 10° C. per minute.

Crystals of the component A begin to precipitate out of solution and as the cooling continues the component B precipitates out of the solution and deposits epitaxially on the crystals of component A.

When the temperature of the solution has decreased to approximately 300° C. to 400° C. the furnace is turned off and the solution allowed to cool to room temperature.

After the solution has solidified, the quartz chamber is removed from the furnace and the now solidified solution removed.

The original solvent is dissolved off of the crystals consisting of a substrate of A and an epitaxial layer of B with a solvent which will not attack the crystals for example hydrochloric or nitric acid.

Figure 2:
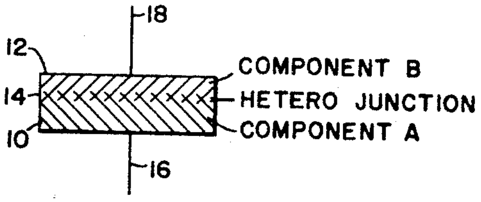
FIG. 2 is a side view, in cross-section, of a heterojunction semiconductor device prepared in accordance with the teachings of this invention.

With reference to FIG. 2, each of the crystals consisting of a substrate 10 of component A with an epitaxial layer 12 of component B disposed on one surface thereof. There is a heterojunction 14 between the substrate 10 and the epitaxial layer 12.

Electrical contacts 16 and 18 are affixed to the substrate 10 and the layer 12. Such a device is suitable for use as a diode or rectifier.

The following examples are illustrative of the teachings of this invention.

EXAMPLE I

A charge consisting of 5%, by weight, germanium, 27% by weight, gallium arsenide, remainder gallium was sealed in a quartz chamber.

The lattice constant of gallium arsenide is 5.65° A. and the lattice constant of germanium is 5.66 A.

The chamber was disposed in a furance and the charge heated to a temperature of 950° C. at which temperature the entire charge was molten and the germanium and gallium arsenide were in solution in the gallium.

The charge was then cooled at a rate of 0.77° C. per minute to a temperature of 400° C.

At the beginning of the cooling gallium arsenide crystals began precipitating from the solution.

When the temperature of the charge reached 400° C. the furnace was turned off and the charge was allowed to cool to room temperature.

The charge was then removed from the chamber and the now solidified gallium solvent dissolved off from the crystals with nitric acid.

A crystal was sectioned, etched and examined under a microscope. The crystal was found to consist of a gallium arsenide substrate having a thickness of about 9 mils with an epitaxial layer of germanium disposed on one surface. The germanium layer had a thickness of 4 mils.

An electrical contact in the form of a solid wire was affixed by pressure bonding to the substrate and to the epitaxial layer, as shown in FIG. 2 and the crystal was connected in an electrical circuit arrangement with a power source and an oscilliscope. The scope trace clearly showed the crystals to have rectifying properties.

The procedure of Example I was repeated with the materials set forth in the table below and under the conditions set forth in the table. In each case, the crystal formed was found to have an epitaxial layer of semiconductor material on a substrate of a second semiconductor material and each crystal was found to have rectifying properties.

In a modification of the present invention the substrate, component A, may be introduced into the solution in the form of crystal bodies with surfaces of <111> orientation.

The material which is to be deposited as an epitaxial layer, component B, and the solvent are then heated to a temperature sufficient to ensure the complete solubility of component B within the solvent. The system is then cooled at the rate set forth hereinabove whereby component B deposits as an epitaxial layer on the crystal bodies of component A.

It is to be understood while the above description and drawings described relate to a particular specific embodiment of the invention many variations can be made without departing from the scope of the invention.

We claim as our invention:

1. A process of forming a heterojunction device by growing an epitaxial layer of a first semiconductor material upon a crystal of a second semiconductor material comprising the steps of:

(1) forming a charge consisting of a first semiconductor material, a second semiconductor material and a metal solvent, the lattice constant of the two semiconductor materials being within 25% of each other, the charge consisting of, by weight, from 1% to 30% of said second semiconductor material, from 0.1% to 5% of said first semiconductor material, the amount of said first semiconductor material in said charge not exceeding one-half the amount of said second semi-conductor material in said charge, and the remainder being the metal solvent, (2) heating the charge to a first temperature whereby the first and second semiconductor materials are completely in solution in said solvent, (3) cooling said charge at a rate not exceeding 10° C. per minute to a temperature whereby the first semiconductor material deposits epitaxially on precipitated crystal of said second semi-conductor material, and (4) dissolving off the solvent metal, leaving crystals of said second semiconductor material with epitaxial layers of said first semiconductor material said crystals having rectifying properties.

2. A process according to claim 1 wherein said sec-

TABLE

| Compound | | Lattice Constant, A. | | | | | | | | |
|---|---|---|---|---|---|---|---|---|---|---|
| Substrate | Epitaxial Layer | Substrate Material | Epitaxial Material | Solvent | Composition of Charge in Wt. Percent | Temperature to Which Charge Was Heated to Ensure Complete Solution, ° C. | Cooling Rate, ° C./Min. | Temperature at Which Controlled Cooling Was Discontinued, ° C. | Substrate Thickness, Mils | Expitaxial Layer Thickness, Mils |
| GaAs | Ge | 5.65 | 5.66 | Ga | GaAs, 27; Ge; 5, Ga, Remainder | 950 | .77 | 400 | 8-10 | 4 |
| GaSb | Ge | 6.11 | 5.66 | Ga | GaSb, 20; Ge, 4.3; Ga, Remainder | 650 | .77 | 300 | 8-10 | 4 |
| Ge | AlAs | 5.66 | 5.63 | Al | Ge, 17; AlAs, 0.1; Al, Remainder | 900 | .77 | 400 | 8-10 | 1 |
| GaSb | Si | 6.11 | 5.43 | Ga | GaSb, 20; Si, 1.5; Ga, Remainder | 650 | .77 | 300 | 8 | 2 |
| GaP | Si | 5.45 | 5.43 | Ga | GaP, 10; Si, 0.3; Ga, Remainder | 1,050 | .25 | 400 | 10 | 2 |
| AlP | Si | 5.46 | 5.43 | Al | AlP, 15; Si, 0.1; Al, Remainder | 800 | .77 | 400 | 10 | 1 |
| ZnS | Si | 5.41 | 5.43 | Zn | ZnS, 20; Si, 1; Zn, Remainder | 800 | .77 | 400 | 8-10 | 1 |
| AlSb | GaSb | 6.10 | 6.11 | Ga | AlSb, 20; GaSb, 2; Ga, Remainder | 950 | .77 | 400 | 8-10 | 1 |
| GaAs | AlAs | 5.65 | 5.63 | Ga | GaAs, 17; AlAs, 0.15; Ga, Remainder | 950 | .77 | 400 | 9 | 1 |
| GaP | AlP | 5.45 | 5.46 | Ga | GaP, 17; AlP, 0.12; Ga, Remainder | 950 | .8 | 400 | 8 | 1 |
| InAs | ZnTe | 6.06 | 6.10 | In | InAs, 15; ZnTe, 1; In, Remainder | 900 | 1 | 350 | 10 | 2 |
| InAs | CdSe | 6.06 | 6.05 | In | InAs, 15; Cds, 0.3; In, Remainder | 900 | .9 | 350 | 8-10 | 1 |

ond semiconductor material is included in said charge in an amount by weight, of from 10% to 30%.

References Cited

UNITED STATES PATENTS

| | | | |
|---|---|---|---|
| 3,057,762 | 10/1962 | Gans | 148—177 XR |
| 3,124,452 | 3/1964 | Kraft. | |
| 3,205,101 | 9/1965 | Mlavsky et al. | 148—1.5 XR |
| 3,226,225 | 12/1965 | Weiss et al. | 148—1.5 XR |
| 3,272,669 | 9/1966 | Iin | 148—177 XR |

| | | | |
|---|---|---|---|
| 3,290,188 | 12/1966 | Ross | 148—177 |
| 3,301,716 | 1/1967 | Kleinknecht | 148—1.5 |
| 3,351,502 | 11/1967 | Rediker | 148—1.6 XR |
| 3,360,406 | 12/1967 | Sumski | 148—1.6 |

L. DEWAYNE RUTLEDGE, *Primary Examiner.*

P. WEINSTEIN, *Assistant Examiner.*

U.S. Cl. X.R.

117—200, 201; 23—295, 301; 148—1.6, 171, 172, 177